Patented June 2, 1936

2,042,621

UNITED STATES PATENT OFFICE 2,042,621

ALKYLOL AMINES

John F. Olin, Philadelphia, Pa., assignor to The Sharples Solvents Corporation, Philadelphia, Pa., a corporation of Delaware No Drawing. Application January 16, 1934, Serial No. 706,834

6 Claims. (Cl. 260—127)

The present invention relates to a new class of chemical compounds which may be formed by the reaction of mono- and di-amyl amines with glycerol mono- and di-chlorhydrins, namely 1-mono- and -di-amyl amino propane-diols and bis mono- and di-amyl amino propanols. These compounds may be considered as derivatives of glycerol having one or more hydroxyl radicals replaced by mono- or di-amyl amino radicals. The new compounds have the following structural formulæ:

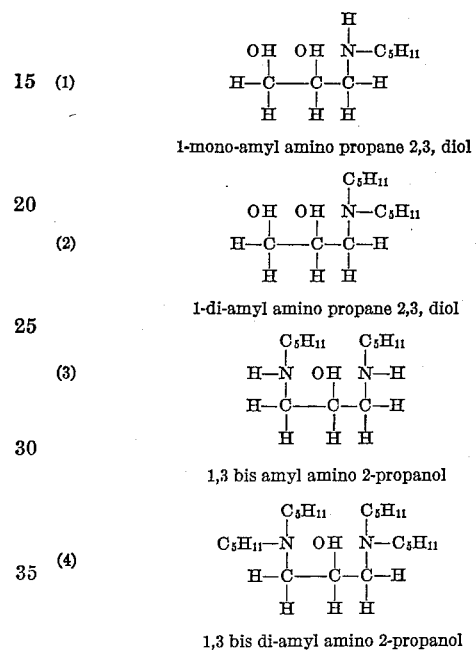

In producing the new compounds, a mixture of the glycerol chlorhydrin and the mono- or di-amyl amine with which it is to be reacted is first warmed to cause the reaction to take place. At the completion of the reaction, the mixture is treated with potassium- or sodium-hydroxide until it is strongly alkaline. The desired amino compound may thereafter be removed from other constituents of the mixture by the methods indicated in the following illustrative examples. The formation of the new compounds is believed to occur in accordance with the following equations:

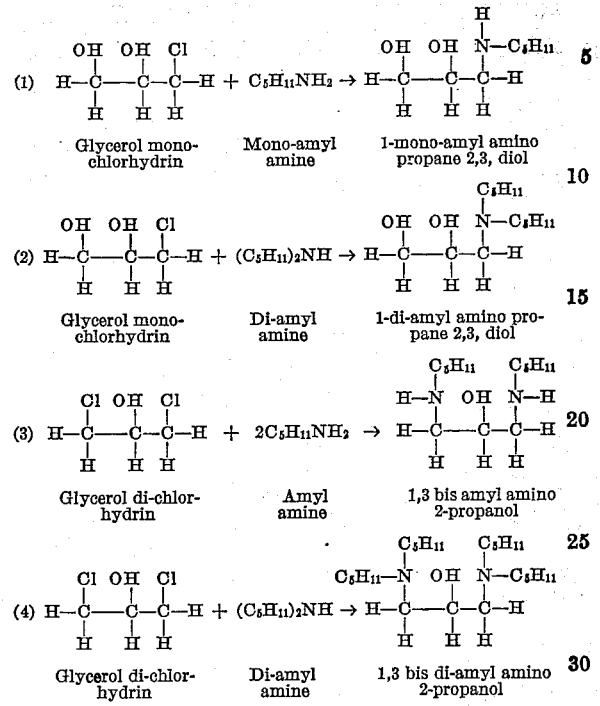

All of these new amino compounds react with fatty acids and with alkyl sulphuric acids to form soaps or salts having valuable detergent and emulsifying properties. The compound indicated at (1) above is especially valuable in this connection. These new amyl substituted alkylol amines, unlike the simpler amines, are soluble in organic compounds such as ether, benzene and naphtha. They are strongly basic and will readily absorb carbon dioxide and hydrogen sulphide.

EXAMPLE 1

*1-mono n-amyl amino propane 2,3 diol*

140 grams of n-amylamine, 112 grams of glycerol mono-chlorhydrin and 200 grams of water were placed in a 1 liter flask and warmed. After several moments a strong reaction set in, causing the contents of the flask to boil vigorously. The flame was removed and the reaction allowed to proceed until it had subsided. The contents of the flask were then refluxed for one-half hour longer. The mixture was made strongly alkaline with potassium hydroxide and the amine layer removed. Upon fractional distillation n-amyl amino propane 2,3 diol was obtained as a thick, colorless oil, boiling point 195° at 32 mms. This amine is strongly basic and is readily soluble in water. Both the free amine and its solutions will absorb carbon dioxide from the air.

Example 2

*1-di n-amyl amino propane diol 2,3*

477 grams of di n-amylamine and 336 grams of glycerol mono-chlorhydrin were refluxed together for 2 hours and then made alkaline. The oily layer was removed and vacuum distilled. It boiled at 188–194° at 32 mms. It was a colorless oil having but little odor, and is soluble in organic liquids but insoluble in water.

Example 3

*1,3 bis amyl amino 2-propanol*

435 grams of n-amyl amine and 129 grams of glycerol dichlorhydrin were mixed together. On warming, a strong reaction took place. When this had subsided the reaction mixture was made strongly alkaline and the oily layer removed by extraction with ether, filtered and distilled. It boiled at 195–200° at 29 mms. On standing, the material solidified to a colorless mass. This amine is readily soluble in organic substances, such as oils, benzene, alcohol, etc., but is only slightly soluble in water.

Example 4

*1,3 bis diamyl amino 2-propanol*

320 grams of mixed diamylamines and 130 grams of glycerol di-chlorhydrin were refluxed 1 hour and made alkaline with potassium hydroxide. The desired compound was obtained as an oily liquid, B. P. 232–250° at 20 mms. It is quite insoluble in water, but is soluble in organic liquids.

I claim:

1. As a new chemical compound, a bis-amyl amino derivative of glycerol.
2. As a new chemical compound, a bis-di-amyl amino derivative of glycerol.
3. As a new chemical compound, a mono-amyl amino derivative of glycerol.
4. As a new chemical compound, a bis-mono-amyl amino derivative of glycerol.
5. As a new chemical compound, 1-mono-amyl amino propane 2,3, diol.
6. As a new chemical compound, 1,3 bis-amyl amino 2-propanol.

JOHN F. OLIN.